(No Model.)
H. WRIGHT.
Fertilizer Attachment for Seed Planters.
No. 237,428. Patented Feb. 8, 1881.
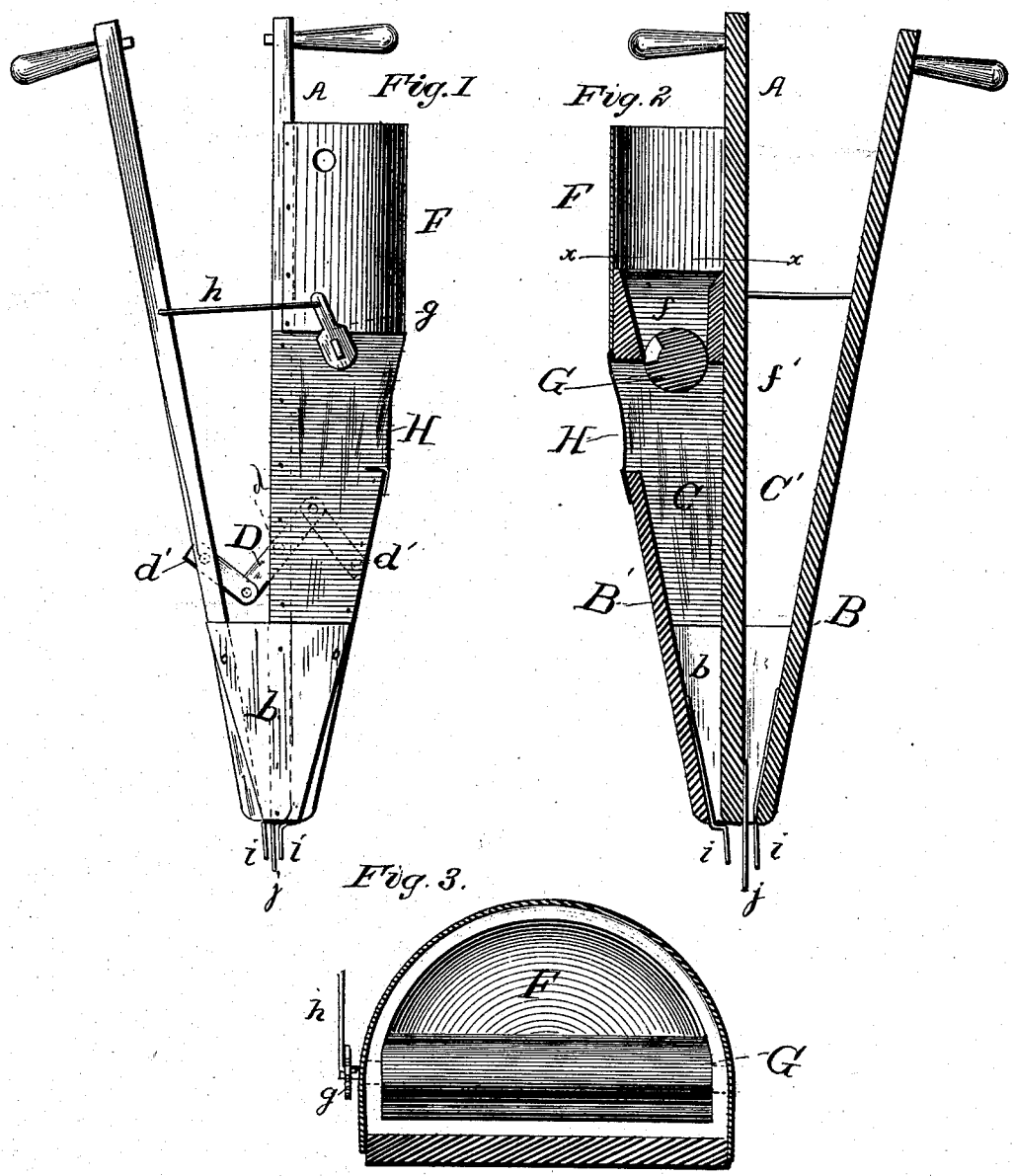
Witnesses
Fred G. Dieterich
A. H. Krause
Inventor
Harvey Wright
By N. W. Fitzgerald
Attorney

UNITED STATES PATENT OFFICE.

HARVEY WRIGHT, OF NEW ENGLAND, OHIO.

FERTILIZER ATTACHMENT FOR SEED-PLANTERS.

SPECIFICATION forming part of Letters Patent No. 237,428, dated February 8, 1881.

Application filed October 11, 1880. (No model.)

*To all whom it may concern:*

Be it known that I, HARVEY WRIGHT, of New England, in the county of Athens and State of Ohio, have invented certain new and useful Improvements in Hand Seed-Planters and Fertilizing Attachments; and I do hereby declare the following to be a full, clear, and exact description of the same, reference being made to the accompanying drawings, forming a part of this specification, and in which—

Figure 1 represents a side elevation of my improved planter; Fig. 2, a vertical section, and Fig. 3 a top or plan, of the fertilizing attachment.

My invention relates to certain new and useful improvements in the class of hand seed-planters to which is attached a fertilizing device for the purpose of equally disseminating fertilizing material beneath the seed planted; and to this end the invention consists in novel constructions and combinations of parts, to be hereinafter referred to, and specifically designated in the claims.

In the drawings, A represents a central division-board, forming between it and the pivoted boards B B', on each side thereof, two compartments, C C', through which the seed and fertilizing material are conducted to the ground. These boards B B' are connected to the central board, at their lower ends, by the side plates, b b, and centrally by the hinge D, composed of the lever d, centrally pivoted to the side of the central board, and its ends connected by links d' d' to the sides of the boards B B', said links being provided with a series of adjusting-holes, whereby the discharge of the seed and fertilizing material can be regulated at the bottom or discharge openings of the compartments C C'.

The division-board A is provided on one side with a hopper, F, for the reception of the fertilizing material, said hopper being provided with a flaring bottom, f, having the discharge-opening f', closed by a slotted or grooved cylinder, G, which receives and discharges the fertilizing material into the compartment C below. This cylinder has one of its journals extended outside of the hopper, and to which is secured a crank, g, connected with board B by a rod, h, through the medium of which said cylinder is partially revolved for the purpose of discharging the fertilizing material into the compartment C, from which it is conducted into the ground in the manner to be hereinafter described.

The board B' is much shorter than board B, and a flexible covering, of oil-cloth or other suitable material, H, is used for protecting the fertilizing material, or forming a tight and flexible compartment between it and the bottom of the hopper, through which the material is conducted into the ground.

The lower ends of the boards A B B' are provided with shovels *i i j*, the shovel *j* of board A extending below the shovels *i i*, which, when the upper ends of the boards are drawn apart, will press against the sides of the shovel *j*, forming receptacles for the seed and fertilizing material, in which condition the shovels are forced into the ground, after which the boards are forced or drawn toward each other by the operator, which will move the shovels apart, and thus the seed and fertilizing material will be dropped or discharged into the ground.

I am aware that a combined hand corn-planter and fertilizer-distributer having a stationary center board and two pivoted side boards, forming a compartment upon each side of the center board, is old; and such I do not wish to be understood as claiming, broadly, as of my invention.

Having thus fully described my invention, what I claim as new, and desire to secure by Letters Patent, is—

1. In a hand seed-planter and fertilizing attachment, the combination of the boards A B B' and their connecting devices, composed of the plates *b b*, centrally-pivoted lever *d*, and connecting-links *d' d'*, arranged relatively to each other, as herein shown and described.

2. The herein-described arrangement of the boards A B B' and their connecting devices, fertilizing-hopper F, slotted or grooved discharge-cylinder G, and operating-crank and connecting-rod *g h*, as and for the purpose specified.

In testimony whereof I affix my signature in presence of two witnesses.

HARVEY WRIGHT.

Witnesses:
W. H. H. MINTUN,
J. H. CALKINS.